(12) United States Patent
Baudasse

(10) Patent No.: US 8,544,357 B2
(45) Date of Patent: Oct. 1, 2013

(54) DIFFERENTIAL ROLLER SCREW

(75) Inventor: Yannick Baudasse, Grasse (FR)

(73) Assignee: Thales, Neuilly sur Seine (FR)

( * ) Notice: Subject to any disclaimer, the term of this patent is extended or adjusted under 35 U.S.C. 154(b) by 11 days.

(21) Appl. No.: 13/502,336

(22) PCT Filed: Sep. 29, 2010

(86) PCT No.: PCT/EP2010/064490
§ 371 (c)(1),
(2), (4) Date: Apr. 16, 2012

(87) PCT Pub. No.: WO2011/045182
PCT Pub. Date: Apr. 21, 2011

(65) Prior Publication Data
US 2012/0204665 A1      Aug. 16, 2012

(30) Foreign Application Priority Data
Oct. 16, 2009   (FR) ...................................... 09 04970

(51) Int. Cl.
*F16H 1/24* (2006.01)
*F16H 55/02* (2006.01)

(52) U.S. Cl.
USPC ...................................................... 74/424.92

(58) Field of Classification Search
USPC .......................... 74/424.91, 424.92; 475/226
See application file for complete search history.

(56) References Cited

U.S. PATENT DOCUMENTS

| | | | | |
|---|---|---|---|---|
| 4,741,250 A | * | 5/1988 | Weyer | 92/33 |
| 5,370,012 A | * | 12/1994 | Stanley | 74/424.92 |
| 6,318,516 B1 | | 11/2001 | Zernickel et al. | |
| 7,044,012 B2 | | 5/2006 | Dubus et al. | |
| 2010/0269616 A1 | * | 10/2010 | Merlet et al. | 74/424.92 |

FOREIGN PATENT DOCUMENTS

| | | |
|---|---|---|
| DE | 19823154 C1 | 11/1999 |
| EP | 0249674 A1 | 12/1987 |
| FR | 2839127 A1 | 10/2003 |
| JP | 2008-309218 A1 | 12/2008 |

* cited by examiner

*Primary Examiner* — Justin Krause
(74) *Attorney, Agent, or Firm* — Baker & Hostetler LLP

(57) ABSTRACT

A differential roller screw comprises an outer nut, and rolling elements comprising a first set of rollers equipped with first grooves, the first set being arranged in a first cylindrical ring around the screw. The screw comprises a second set of rollers equipped with second grooves. The second set is arranged in a second cylindrical ring. The two cylindrical rings are coaxial. An intermediate cylindrical element is arranged between the two sets of rollers, the intermediate element comprising a first internal thread formed with a first pitch and having a first direction and a second external thread formed with a second pitch and having a second direction opposite the first direction.

11 Claims, 5 Drawing Sheets

DIFFERENTIAL ROLLER SCREW

CROSS-REFERENCE TO RELATED APPLICATIONS

This application is a National Stage of International patent application PCT/EP2010/064490, filed on Sep. 29, 2010, which claims priority to foreign French patent application No. FR 0904970, filed on Oct. 16, 2009, the disclosures of which are incorporated by reference in their entirety.

FIELD OF THE INVENTION

The present invention relates to the field of rolling screws and more particularly to roller screws. The invention relates to the field of roller screws capable of supporting very high loads whilst affording a high degree of accuracy in adjusting the translational movement.

BACKGROUND

Roller screws are used to convert rotational movements into linear displacements, and vice versa. The rolling elements are threaded rollers arranged between a screw and a nut. The rollers are spaced apart and are contained within a cylindrical ring around the screw. They are also called "satellite roller screws".

The large number of points of contact generally enables satellite roller screws to support very high loads.

Roller screws are currently preferred to ball screws in some applications. Notably, they have an advantage over ball screws when the acceptable static and dynamic loading capacities are higher.

The threaded rollers perform the rolling function instead of the balls, and the load is distributed over a greater number of points of contact.

The roller screws may also have pitches corresponding to whole numbers or to real numbers, which is advantageous for estimating the reduction in force and calculating the distances of translational movement. The pitch may be chosen freely and made without any particular modification to the geometry of the nut or the screw.

Several types of roller screws exist. Notably, there are non-recirculating roller screws, recirculating roller screws and other arrangements such as inverted roller screws.

A roller screw with rollers that do not recirculate comprises a nut which has an internal thread that is identical to that of the screw.

The rollers have a single-start thread with a helix angle corresponding to that of the nut. There is thus no axial displacement between the nut and the rollers. There is therefore no need for the rollers to recirculate.

A recirculating roller screw comprises a thread. The nut has a thread that is identical to the thread of the screw. The rollers are not threaded but have grooves arranged perpendicularly to the axis of the screw. The distance between the grooves corresponds to the transverse pitch of the screw and the nut.

When the screw or the nut rotates, the rollers are displaced axially in the nut. After one complete revolution, each roller is returned to the starting position by two cams fixed at the ends of the nut. This recirculating of the rollers is made possible by a longitudinal groove in the nut.

FIG. 1 shows an embodiment of such a roller screw. A roller screw 100 comprises a plurality of rollers 102 contained within a structure 103 which allows the loads to be distributed satisfactorily whilst preserving a spacing between the rollers and ensuring contact, on the one hand, between the rollers 102 and the screw 100 and, on the other hand, between the rollers 102 and the nut 101 which has an internal thread. The unit formed by the structure 103, the rollers 102 and the nut 101 is held between two cams 104 which enable the rollers to return to their starting position after one complete revolution.

An inverted roller screw has a thread. The nut has a thread that is identical to the thread of the screw. The kinematic movement is inverted as in this case it is the nut which moves in translation under the rotational effect of the screw.

The reduction capacities of the screws are today limited by the form of the pitches. By way of example, 0.5 mm is the accuracy of translational movement achieved by screws from the prior art.

Moreover, the need for a high reduction is incompatible with a high load absorption capacity, as the threads have a small cross-section. This incompatibility necessitates a much larger screw diameter, a greater roller length and a higher number of rollers. Thus for a rolling bearing offering a high reduction and a high load absorption capacity, the rolling screw becomes too large.

SUMMARY OF THE INVENTION

An object of the invention is to overcome the abovementioned disadvantages.

Notably, the invention makes it possible to increase the reduction capacity of a roller screw without adversely affecting its load absorption capacity. To do this, the addition of a second stage working in a differential fashion is required. The latter stage makes it possible to preserve a small size, with no increase in the diameter of the screw.

The invention thus allows a new arrangement which increases the reduction ratio without adversely affecting performance.

The differential roller screw comprises an outer nut, rolling elements comprising a first set of rollers equipped with first grooves, the first set of rollers being arranged in a first cylindrical ring around the screw. It also comprises a second set of rollers equipped with second grooves, the second set of rollers being arranged in a second cylindrical ring, the two cylindrical rings being coaxial. An intermediate cylindrical element is arranged between the two sets of rollers. The intermediate element comprises a first internal thread formed with a first pitch and having a first direction and a second external thread formed with a second pitch and having a second direction opposite the first direction.

The rollers are advantageously threaded, the threads being formed by the first and second grooves.

In other words, the differential roller screw comprises an outer nut, rolling elements comprising a first set of threaded rollers, the thread being formed with a first pitch and having a first direction, the first set being arranged in a first cylindrical ring around the screw.

The screw advantageously comprises a second set of threaded rollers, the thread being formed with a second pitch and having a second direction opposite the first direction, the second set being arranged in a second cylindrical ring, the two cylindrical rings being coaxial, and a cylindrical intermediate element being arranged between the two sets of rollers, the intermediate element comprising a first internal thread corresponding to the first pitch and a second external thread corresponding to the second pitch.

According to another feature of the invention, the first and second grooves are circular.

In one embodiment, the cross-section of the grooves of the rollers is advantageously triangular.

The intermediate element is advantageously driven in rotation by a motor, the intermediate element moving in translation in the first direction, the nut being driven in translation in the second direction, the screw being fixed.

The intermediate element is advantageously driven in rotation by a motor, the intermediate element being connected to the motor and guiding it in rotation, the intermediate element moving in translation in the first direction, the screw being driven in translation in the second direction, the nut being fixed.

The nut is advantageously a hub.

The rollers are advantageously recirculating rollers, the rollers comprising a cam and a locking finger.

The rollers advantageously comprise two threaded circular parts at each end of the roller, the central part of the rollers having a smaller radius than the threaded parts.

BRIEF DESCRIPTION OF THE DRAWINGS

Other features and advantages of the invention will become apparent on reading the following description which is made with reference to the attached drawings, in which.

DETAILED DESCRIPTION

Figure 1:
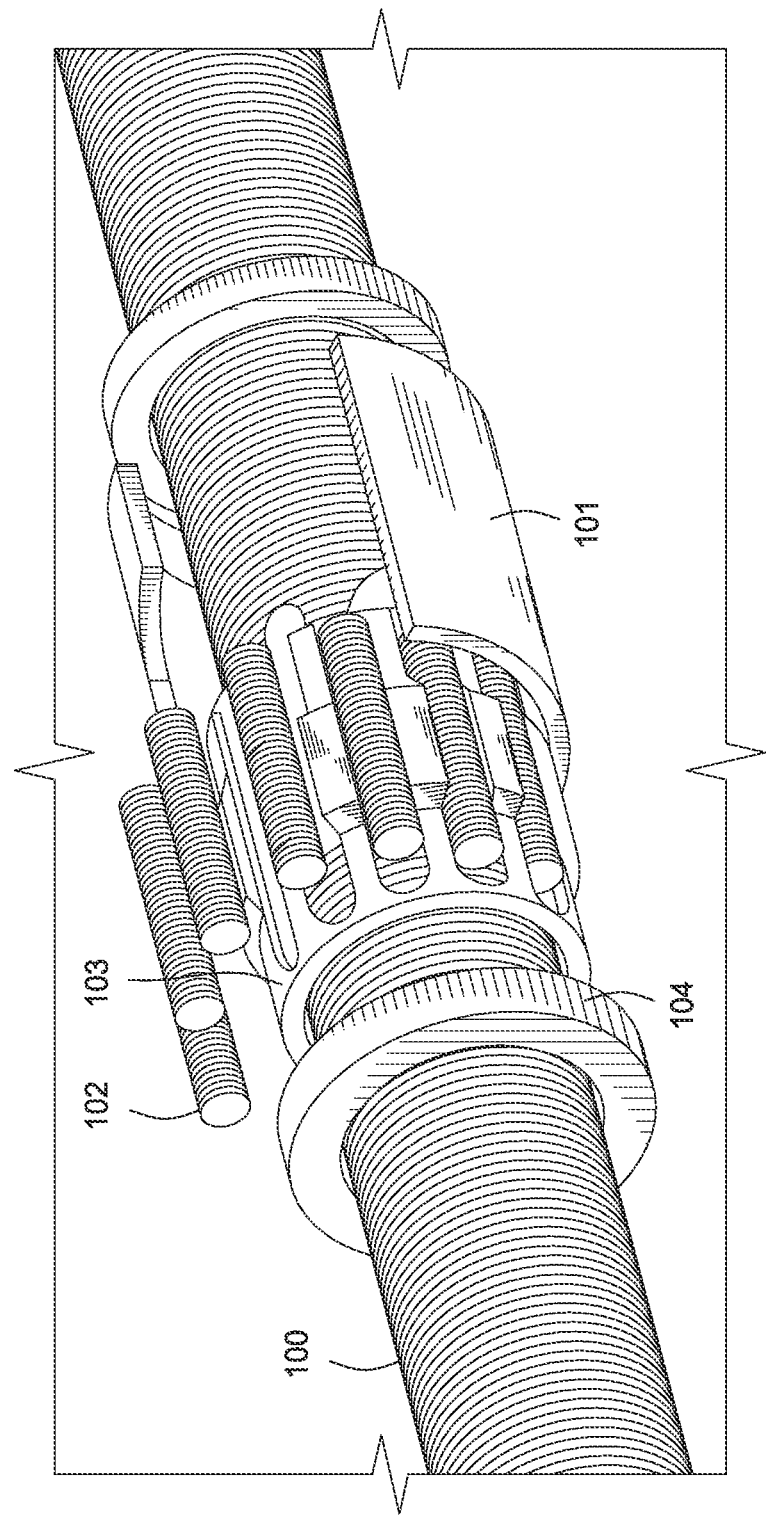
FIG. 1 shows a roller screw from the prior art comprising one roller stage.
Figure 2:
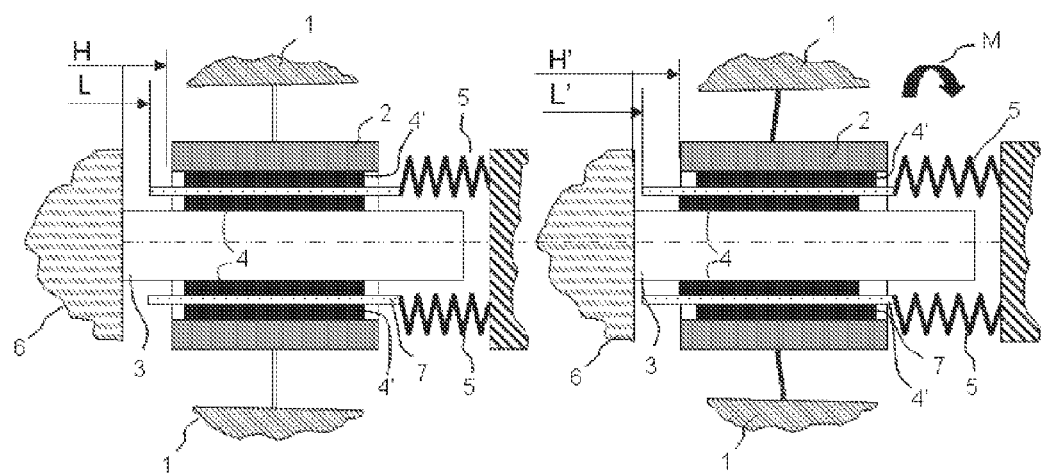
FIG. 2 shows a differential screw according to the invention comprising an intermediate piece and two roller stages.

FIG. 2 shows two configurations of a roller screw according to the invention. The first configuration shows a roller screw in a first state termed the "initial state". The second configuration shows the roller screw when the motor M has generated a translational movement between the screw and the nut; the roller screw is therefore in a second state termed the "final state".

In these configurations, the screw 1 is fixed, in other words locked in rotation and in translation to a fixed part 6. The nut 2 is locked in rotation by a part that is fixed in rotation 1 but can be displaced in translation. An intermediate piece 7 is driven in rotation by a motor 5 and can be displaced in translation.

In the first configuration, the screw 3 is fixed to a fixed part 6. The intermediate piece 7 is tubular and hollow and surrounds the screw. The intermediate piece 7 of the invention is threaded over its external diameter with a pitch P2 and tapped over its internal diameter with a pitch P1 that is the opposite of the former.

The intermediate piece 7 is connected to the central screw via a first set of peripheral rollers 4 of pitch P1 and to the outer nut 2 by a second set of peripheral rollers 4' of pitch P2.

When the intermediate piece 1 is driven in rotation, it is displaced by a linear movement of P1/revolution in a first direction called the negative direction. The outer nut is displaced by P2/revolution in the opposite direction to the first direction, called the positive direction.

The relative movement of the nut relative to the screw is thus the sum of the two opposing translational movements. The translational movement of the nut relative to the screw is thus reduced to a high degree as it results from a difference in pitch between P1 and P2.

A piece 5 enables driving energy to be imparted to the intermediate piece 7.

The intermediate piece 7, which is originally at a distance L from the fixed piece 6, is moved in translation in response to an impulse from the motor M. The intermediate piece 7 is displaced by one revolution and is situated at a new distance L'=L−P1 from the fixed part 6.

The nut 1, which is at a distance H from the fixed piece 6, rotates in response to an impulse from the rotation of the intermediate piece via rollers 4'. After one complete revolution of the intermediate piece 7, the nut is moved in translation and is situated at a new distance H'=H+P2−P1.

This gives us the differential translational movement between the nut and the screw, which is calculated after rotation by the distance H'−H which is equal to P2−P1.

The invention allows a very small difference in pitch between P1 and P2 to be selected, notably by selecting pitches P1 and P2 which are close to each other. The accuracy of the reduction ratio is consequently greatly improved.

One exemplary embodiment comprises a screw 3 with a pitch P1 equal to 1 mm and a nut with an internal pitch of 0.9 mm. This configuration makes it possible to obtain a difference in pitch of 0.1 mm. That is to say, when the intermediate piece has made one complete revolution, the translational movement of the nut relative to the screw is 0.1 mm.

Figure 3:
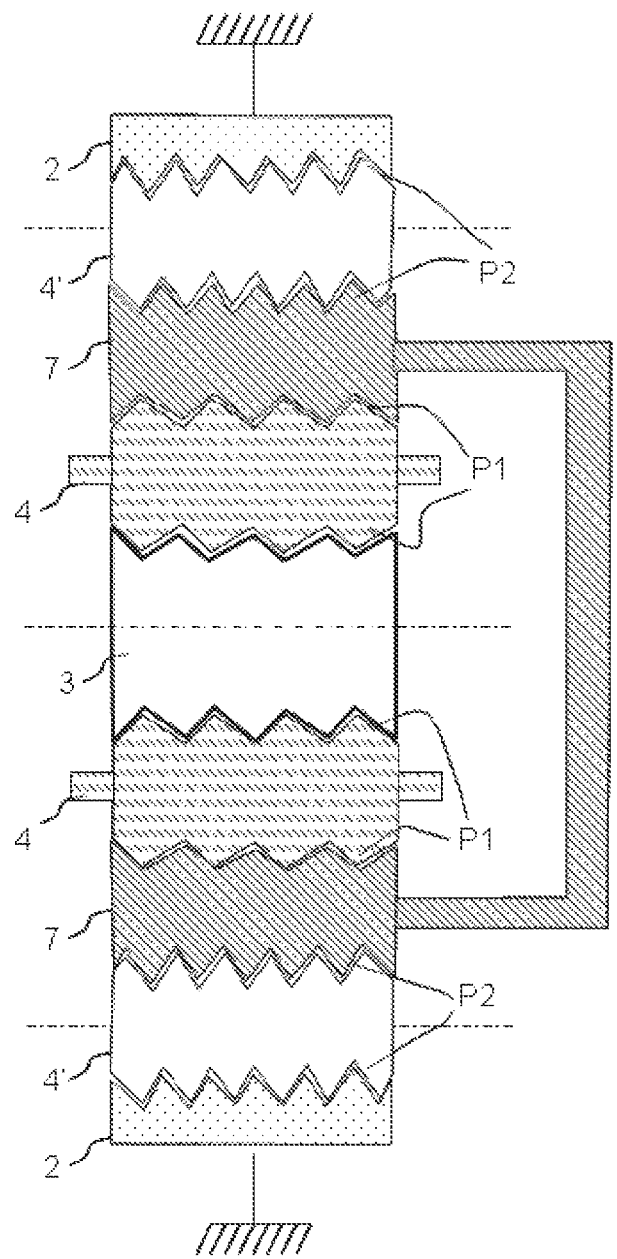
FIG. 3 shows a first detailed view of a differential screw of the invention.

FIG. 3 shows a cross-section of the device of the invention comprising a screw 3, a first set of peripheral rollers 4 with a pitch P1 in contact, on the one hand, with the screw 3 and, on the other hand, with a tubular and hollow intermediate piece 7 with an internal pitch P1 and an external pitch P2. A second set of peripheral rollers 4' is in contact, on the one hand, with the outer part of the intermediate piece 7 and, on the other hand, with the inner part of a nut 2.

Figure 4:
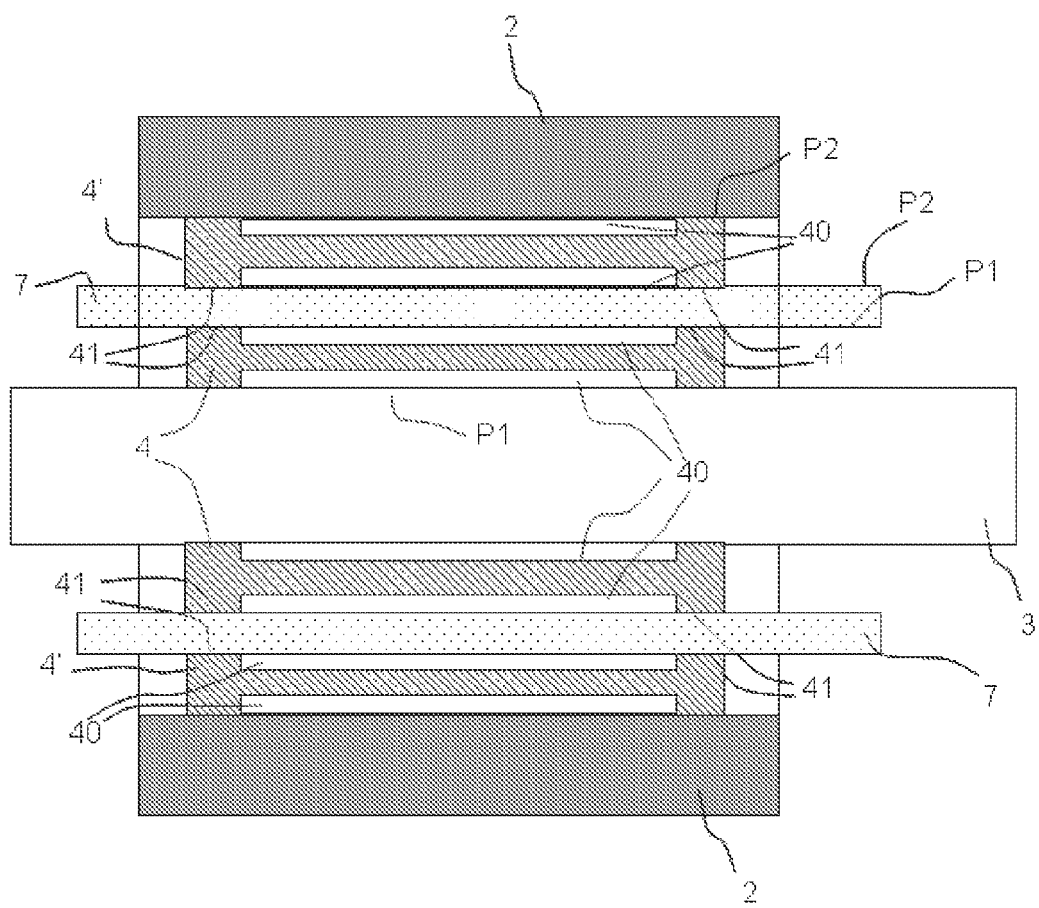
FIG. 4 shows a second detailed view of a differential screw of the invention.

FIG. 4 shows a detailed cross-section of an alternative embodiment of FIG. 2. It shows a screw 3 with a pitch P1, a first set of peripheral rollers 4 with a pitch P1, an intermediate piece 7 with an internal pitch P1 and an external pitch P2, the second set of peripheral rollers 4' with a pitch P2 and the nut 2 with an internal pitch P2.

An alternative embodiment shown in FIG. 4 using rollers with a constant average diameter is the use of rollers having:
  on the one hand, two peripherally threaded cylindrical parts 41, these parts having a first average diameter and a predetermined width, and;
  on the other hand, a hollow unthreaded central part 40 with a smaller radius than that of the peripheral parts.

The hollow central part 40 makes it possible to offer a solution that meets requirements for high torque absorption. This geometry makes it possible to reduce the load moment resulting from failure of the rollers of the screw.

The peripheral parts are in contact with the other pieces, notably with the intermediate piece 7. In contrast, the hollow part is not in contact with the intermediate piece 7.

These rollers make it possible to ensure good contact and good force transmission whilst preserving accuracy in the translational displacement.

Figure 5:
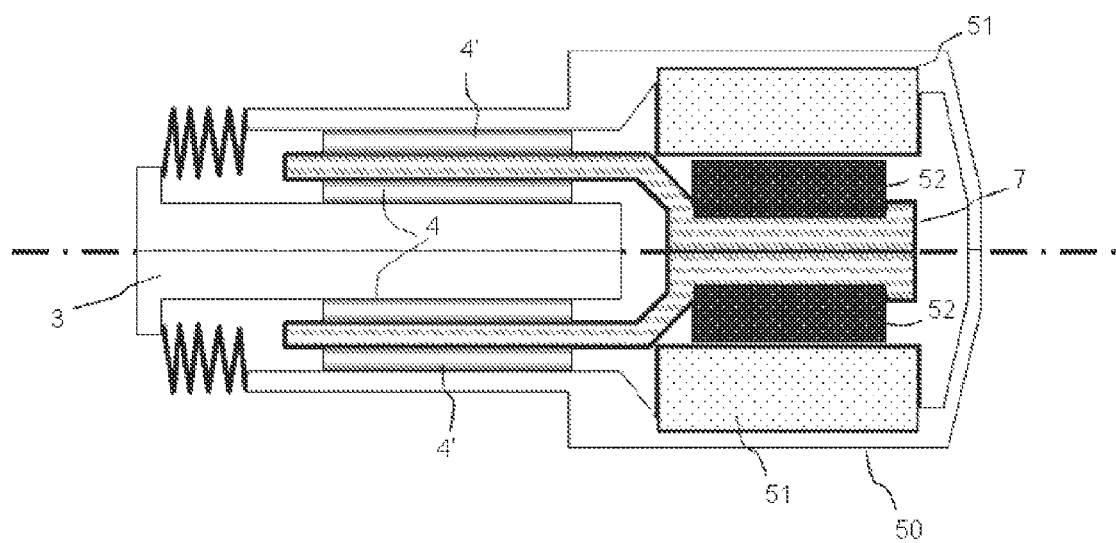
FIG. 5 shows an alternative embodiment of a differential screw of the invention.

FIG. 5 shows an alternative embodiment of the invention. In this alternative embodiment, the screw 3 is free to move in translation and fixed in rotation. The nut represented by a hub 50 is fixed in rotation and in translation and the intermediate part 7 is free to move in rotation and in translation.

The motor comprises a fixed part 51, the stator, connected to the hub, and a removable part 52, the rotor, which drives the intermediate part 7 in rotation.

The screw 3 makes a differential movement of P1−P2 when acted on by the motor. Since the hub 50 is fixed, the relative displacement of the screw relative to the hub corresponds to the difference in pitch between P1 and P2.

In the above-described embodiments, the rollers are threaded. In other words, the first set of rollers is equipped with first helical grooves, also called threads, which engage with the first internal thread of the intermediate part 7. The second set of rollers is equipped with second helical grooves, also called threads, which engage with the second external thread of the intermediate part 7.

In an alternative embodiment, the rollers are not threaded but are provided with circular grooves. The first set of rollers comprises first grooves which engage with the first internal thread of the intermediate element and the second set of rollers comprises second grooves which engage with the second external thread of the intermediate element. The grooves are perpendicular to the axis of the screw, that is to say to the axis of the rollers. The invention has many advantages. The invention notably makes it possible to increase the strength and rigidity capacities. In particular, there is virtually no stacking.

Another advantage is the high reduction capacity. The invention also makes it possible to obtain high strength, rigidity, reduction and irreversibility performance whilst preserving the small size of the device.

Lastly, a final advantage is the possibility of replacing the rolling bearings with rollers. This approach means that electrical actuators or whole mechanisms can be produced which have no rolling bearings.

The invention claimed is:

1. A differential roller screw, comprising:
a first screw,
an outer nut,
rolling elements comprising a first set of rollers equipped with first grooves, the first set of rollers being arranged in a first cylindrical ring around the first screw,
the differential roller screw further comprising:
a second set of rollers equipped with second grooves, the second set of rollers being arranged in a second cylindrical ring, the first cylindrical ring being coaxial with the second cylindrical ring, and
an intermediate cylindrical element being arranged between the first set of rollers and the second set of rollers, the intermediate cylindrical element comprising a first internal thread formed with a first pitch and having a first direction and a second external thread formed with a second pitch having a second direction, the second direction being opposite the first direction.

2. The differential roller screw as claimed in claim 1, wherein the first and second sets of rollers are threaded, the threads on the first and second sets of rollers being formed by the first and second grooves.

3. The differential roller screw as claimed in claim 1, wherein the first and second grooves are circular.

4. The differential roller screw as claimed in claim 1, wherein a cross-section of the grooves of the first and second sets of rollers is triangular.

5. The differential roller screw as claimed in claim 1, wherein the intermediate cylindrical element is driven in rotation by a motor, the intermediate cylindrical element moving in translation in the first direction, the outer nut being driven in translation in the second direction, the first screw being fixed.

6. The differential roller screw as claimed in claim 1, wherein the intermediate cylindrical element is driven in rotation by a motor, the intermediate cylindrical element being connected to the motor and guiding it in rotation, the intermediate cylindrical element moving in translation in the first direction, the first screw being driven in translation in the second direction, the outer nut being fixed.

7. The differential roller screw as claimed in claim 1, wherein the outer nut is a hub.

8. The differential roller screw as claimed in claim 1, wherein the first and second sets of rollers are recirculating rollers, the first and second sets of rollers comprising a cam and a locking finger.

9. The differential roller screw as claimed in claim 1, wherein the first and second sets of rollers comprise two threaded circular parts at each end of each of the first and second sets of rollers, a central part of the first and second sets of rollers having a smaller radius than the threaded parts.

10. The differential roller screw as claimed in claim 1, wherein the intermediate cylindrical element is connected to the first screw via the first set of rollers and to the outer nut via the second set of rollers.

11. The differential roller screw as claimed in claim 1, wherein the first pitch differs from the second pitch.

\* \* \* \* \*